(12) United States Patent
Motohashi (10) Patent No.: US 9,921,391 B2
(45) Date of Patent: Mar. 20, 2018

(54) INTERFERENCE OBJECTIVE LENS AND LIGHT INTERFERENCE MEASURING DEVICE

(71) Applicant: Mitutoyo Corporation, Kawasaki-shi, Kanagawa (JP)

(72) Inventor: Ken Motohashi, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 50 days.

(21) Appl. No.: 14/985,496

(22) Filed: Dec. 31, 2015

(65) Prior Publication Data

US 2016/0195384 A1  Jul. 7, 2016

(30) Foreign Application Priority Data

Jan. 5, 2015 (JP) ................................. 2015-000032

(51) Int. Cl.
| | |
|---|---|
| *G01B 9/02* | (2006.01) |
| *G02B 7/182* | (2006.01) |
| *G02B 26/00* | (2006.01) |
| *G01B 11/24* | (2006.01) |

(52) U.S. Cl.
CPC ......... *G02B 7/1825* (2013.01); *G01B 9/0205* (2013.01); *G01B 9/0209* (2013.01); *G01B 11/2441* (2013.01); *G02B 26/001* (2013.01)

(58) Field of Classification Search
CPC . G01B 11/2441; G01B 9/0209; G01B 9/0205
USPC .................. 356/450, 490, 495, 497; 359/649
See application file for complete search history.

(56) References Cited

U.S. PATENT DOCUMENTS

| | | | | |
|---|---|---|---|---|
| 6,657,728 B1 * | 12/2003 | Okabe | ................ | G01B 9/02049 356/450 |
| 7,773,304 B2 * | 8/2010 | Matsuzaki | ........... | G11B 7/1353 359/649 |
| 9,726,473 B2 * | 8/2017 | Okabe | ................ | G01B 9/02077 |

FOREIGN PATENT DOCUMENTS

| | | |
|---|---|---|
| JP | 05273455 A * | 10/1993 |
| JP | 2011-085655 | 4/2011 |

\* cited by examiner

*Primary Examiner* — Audrey Y Chang
(74) *Attorney, Agent, or Firm* — Rankin, Hill & Clark LLP (57) ABSTRACT

An interference objective lens includes: an objective lens system; a beam splitter which is placed between a measurement surface of a measuring object and a tip end of the objective lens, which diverges light emitted from the objective lens into a reference optical path and a measurement optical path, and which outputs combined wave in which reflection light passing through the reference optical path and reflection light passing through the measuring object are combined; a reference mirror which is placed in the reference optical path and which reflects, by the beam splitter, light diverged into the reference optical path; a mirror holding member which has a spherical surface-shaped outer surface, and which holds the reference mirror such that a reflection surface of the reference mirror passes through a center of a spherical surface; a support member which has a spherical surface-shaped inner surface having a diameter which is substantially equal to the outer surface of the mirror holding member, and which supports the outer surface of the mirror holding member by the inner surface; and a reference mirror adjusting mechanism which adjusts a position of the mirror holding member in the support member.

13 Claims, 11 Drawing Sheets

INTERFERENCE OBJECTIVE LENS AND LIGHT INTERFERENCE MEASURING DEVICE

CROSS-REFERENCE TO RELATED APPLICATION

This non-provisional application claims priority under 35 U.S.C. § 119(a) from Japanese Patent Application No. 2015-000032, filed on Jan. 5, 2015, the entire contents of which are incorporated herein by reference.

BACKGROUND

Technical Field

The present invention relates to a light interference measuring device for carrying out measurement using brightness information of an interference fringe generated by light interference, and also relates to an interference objective lens used for the light interference measuring device.

Conventionally, there is known a light interference measuring device such as a three-dimensional measuring device for precisely measuring a three-dimensional form of a measuring object using brightness information of an interference fringe generated by light interference.

For example, in a light interference measuring device using a white-light light source, in a focus position where optical path lengths of a reference optical path and a measurement optical path matches with each other, and brightness of an interference fringe where peaks of interference fringes of wavelengths are superimpose and synthesized on each other becomes great. Therefore, according to the light interference measuring device, it is possible to take an interference image which shows distribution of interference light strength in an imaging scope by an imaging device such as a CCD camera while changing an optical path length of a reference optical path or a measurement optical path, and to measure a three-dimensional form of a measuring object by detecting a focus position where strength of the interference light peaks in each of measuring positions in the imaging scope.

According to a mirau type interference objective lens which is a kind of interference systems used for a light interference measuring device, it is necessary to relatively change a sample surface and an angle and an inclination direction of a reference mirror so that light which passes through a measurement optical path and light which passes through a reference optical path generate an interference fringe which is suitable for measurement. In many cases, a relative angle between the sample surface and the reference mirror is adjusted by inclining a sample using an inclination stage. On the other hand, JP 2011-85655 A proposes a mirau type interference objective lens which adjusts an angle of a reference mirror instead of a sample. A screw is pressed against an inclination surface of a groove having a V-shaped cross section provided in an outer surface of a holding frame which holds a reference mirror, and the angle of the reference mirror is adjusted by a screwing amount of the screw.

SUMMARY OF THE INVENTION

According to an angle adjusting mechanism of the reference mirror described in JP 2011-85655 A, an inclination angle of the reference mirror is adjusted around a straight line connecting two steel balls with each other which support a holding frame. An interference section lens barrel which holds the reference mirror and a half mirror is rotated around an optical axis, thereby adjusting an inclination direction (orientation of interference fringe). According to the interference objective lens described in JP 2011-85655 A, since it is necessary to respectively move the interference section lens barrel and the holding frame which holds the reference mirror, a structure and an operating method of the interference objective lens become complicated.

Hence, it is an object of the present invention to solve the above problem, to provide an interference objective lens capable of easily adjusting an inclination of a reference mirror for generating an interference fringe, and to provide a light interference measuring device having the interference objective lens.

In order to solve the above problem, an interference objective lens according to the present invention includes: an objective lens system; a beam splitter which is placed between a measurement surface of a measuring object and a tip end of the objective lens system, which diverges light emitted from the objective lens system into a reference optical path and a measurement optical path, and which outputs combined wave in which reflection light passing through the reference optical path and reflection light passing through the measuring object are combined; a reference mirror which is placed in the reference optical path and which reflects, by the beam splitter, light diverged into the reference optical path; a mirror holding member which has a spherical surface-shaped outer surface, and which holds the reference mirror such that a reflection surface of the reference mirror passes through a center of a spherical surface; a support member which has a spherical surface-shaped inner surface having a diameter which is substantially equal to the outer surface of the mirror holding member, and which supports the outer surface of the mirror holding member by the inner surface; and a reference mirror adjusting mechanism which adjusts a position of the mirror holding member in the support member. According to this configuration, it is possible to easily adjust a position of the mirror holding member supported by the spherical surface-shaped inner surface of the support member by the reference mirror adjusting mechanism.

According to the present invention, the interference objective lens further may include a lens barrel incorporating the support member, the mirror holding member may include a projection which projects from the spherical surface-shaped outer surface and which is provided at its tip end with an inclination surface, the reference mirror adjusting mechanism may include an adjusting screw hole placed at a position corresponding to the projection of the lens barrel, and an adjusting screw which is threadedly inserted into the adjusting screw hole and which abuts against an inclination surface of the projection, and an inclination amount of the mirror holding member may be adjusted in accordance with a screwing amount of the adjusting screw. According to this configuration, it is possible to easily adjust the position of the mirror holding member supported by the spherical surface-shaped inner surface of the support member by the screwing amount of the adjusting screw.

According to the present invention, the projection of the mirror holding member may be provided over at least 90° of an outer periphery of the mirror holding member, and the adjusting screw hole may be provided such that it can move in a range which is opposed to a tip end of the projection and which extends over at least 90°. According to this configuration, it is possible to easily adjust an inclination direction by moving the adjusting screw hole.

According to the present invention, the mirror holding member may include a plurality of the projections, and the lens barrel may include a plurality of the adjusting screw holes corresponding to the projections. In this case, especially, the two projections may be provided at positions deviated from each other 90°. According to this configuration, it is possible to easily adjust the inclination direction and an inclination angle by the screwing amount of the two adjusting screws.

According to the present invention, the mirror holding member may be biased in a direction opposite from a direction in which an inclination amount is increased when the adjusting screw is fastened. According to this configuration, even if the screwing amount of the adjusting screw is reduced, it is possible to change the inclination of the mirror holding member following the change of the screwing amount.

To solve the above problems, the light interference measuring device of the present invention includes any one of the above-described interference objective lenses. According to this configuration, it is possible to easily adjust the position of the mirror holding member supported by the spherical surface-shaped inner surface of the support member by the reference mirror adjusting mechanism. As a result, it becomes easy to adjust when measurement is carried out by the light interference measuring device.

DETAILED DESCRIPTION OF THE EMBODIMENTS

First Embodiment

A measuring device of an embodiment of a light interference measuring device according to the present invention in which an interference optical system and an image measuring device are combined will be described below with reference to the drawings.

Figure 1:
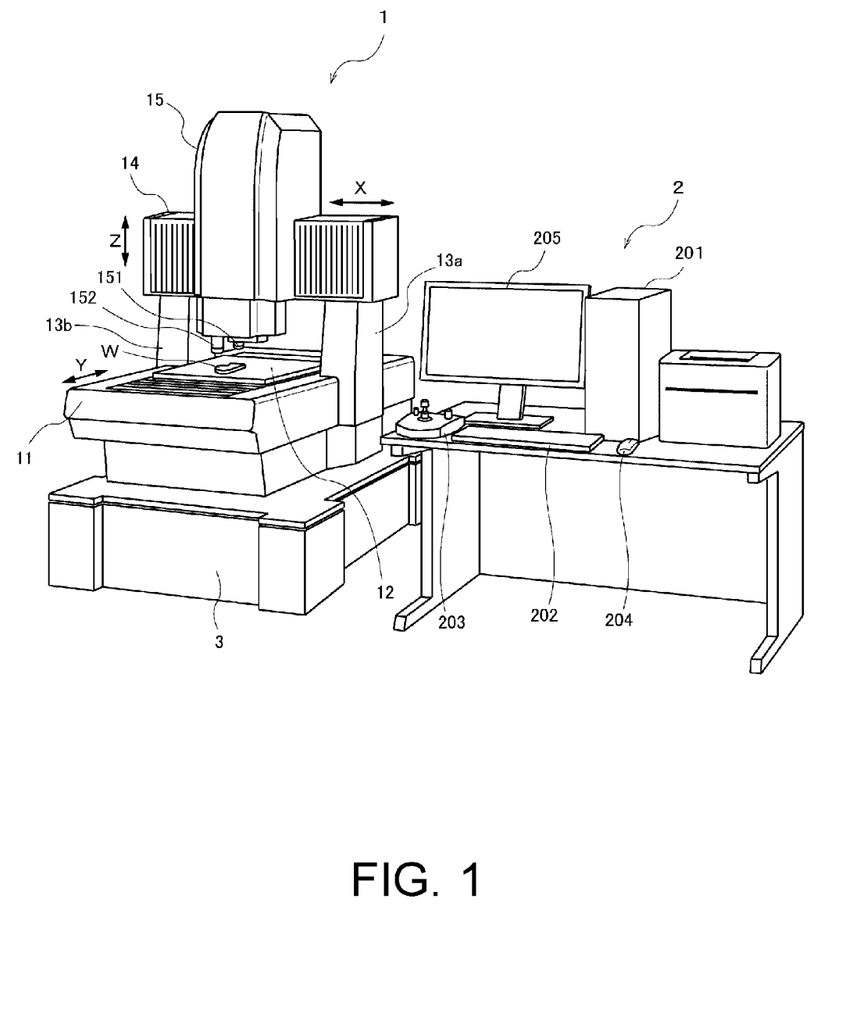
FIG. 1 is a perspective view showing an entire configuration of a measuring device of an embodiment of a light interference measuring device in which an interference optical system and an image measuring device are combined.

FIG. 1 is a perspective view showing an entire configuration of the measuring device of this embodiment in which the interference optical system and the image measuring device are combined. The measuring device in which the interference optical system and the image measuring device are combined includes a non-contact type image measuring machine 1, and a computer system 2 which drives and controls the image measuring machine 1 and which executes necessary data processing. The measuring device in which the interference optical system and the image measuring device are combined may appropriately include a printer which prints out a measurement result.

The image measuring machine 1 includes amount 11, a sample stage (stage) 12, support arms 13a and 13b, an X axis guide 14 and an imaging unit 15. As shown in FIG. 1, the stage 12 is placed such that its upper surface (as base surface) matches with a horizontal surface. A work W is placed on the stage 12. The stage 12 is driven in a Y axis direction by a Y axis drive mechanism (not shown), and can move in the Y axis direction with respect to the imaging unit. The support arms 13a and 13b extending upward are fixed to the central portions of both side edges of the mount 11, and the X axis guide 14 is fixed such that both upper ends of the support arms 13a and 13b are connected to each other. The X axis guide 14 supports the imaging unit 15. The imaging unit 15 is driven along the X axis guide 14 by an X axis drive mechanism (not shown).

The imaging unit 15 is detachably includes a vision optical head 151 for imaging a two-dimensional image of the work W, and a light interference optical head 152 for measuring a three-dimensional form of the work W by light interference measurement, and a work is measured at a measurement position which is set by the computer system 2 using any one of the heads. A measured view of the imaging unit 15 is usually set wider than a measured view of the light interference optical head 152. It is possible to switch between the vision optical head 151 and the light interference optical head 152 and to use the head by the control of the computer system 2. The vision optical head 151 and the light interference optical head 152 are supported by a common support plate such that a constant positional relation is maintained, and they are calibrated so that a measurement coordinate axis is not changed before and after they are switch.

The vision optical head 151 includes a CCD camera, a lighting device and a focusing mechanism, and images a two-dimensional image of the work W. Data of the imaged two-dimensional image is captured into the computer system 2.

Figure 2:
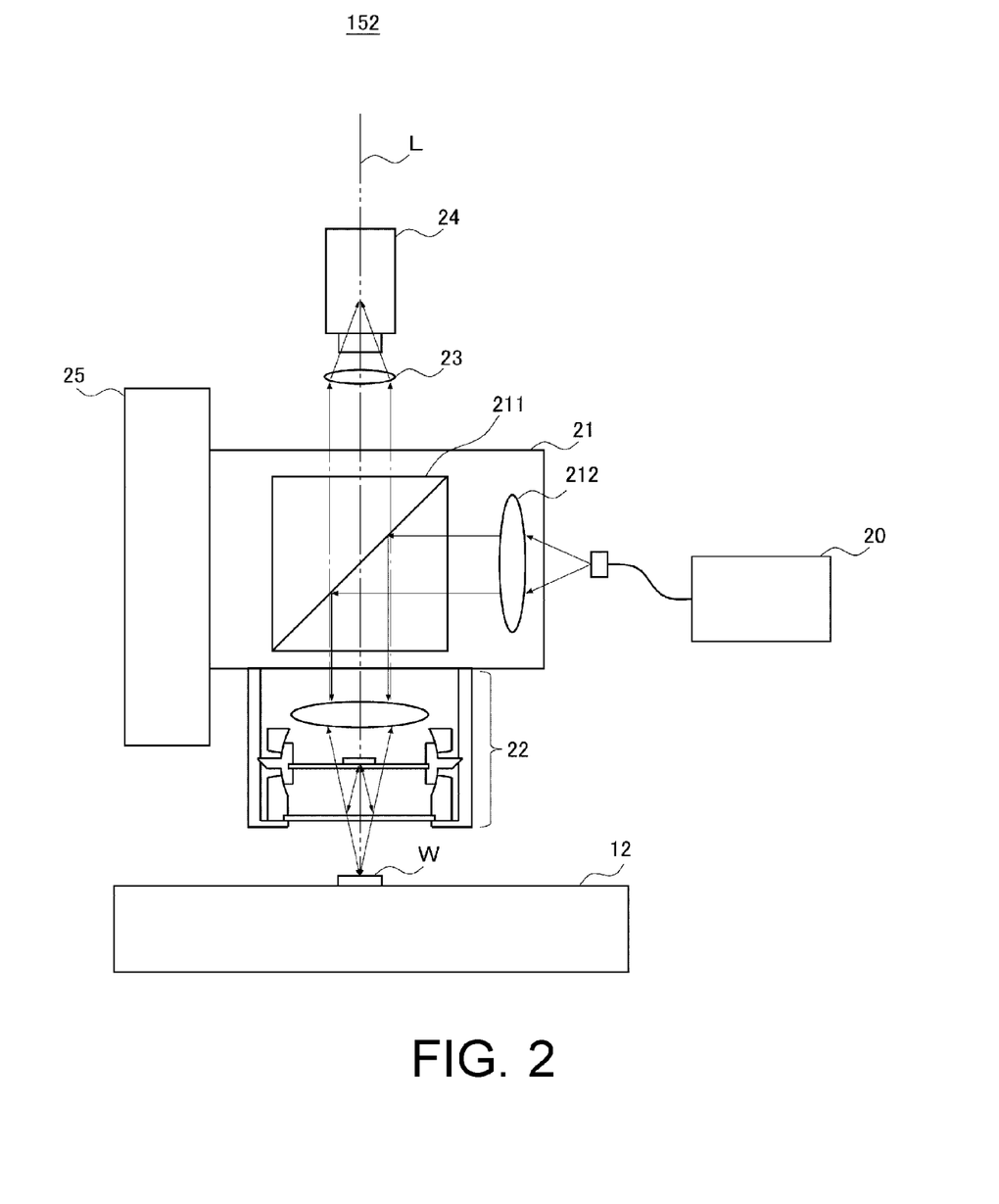
FIG. 2 is a schematic diagram showing a configuration of a light interference optical head 152 together with an optical path.

FIG. 2 is a schematic diagram showing a configuration of the light interference optical head 152. The light interference optical head 152 includes a light output section 20, a light interference optical head section 21, an objective lens section 22, an image forming lens 23, an imaging section 24, and a drive mechanism 25.

The light output section 20 includes a light source which outputs low coherency broadband light having a number of wavelength components over a broadband. A white-light source such as halogen and LED (Light Emitting Diode) is used as the light output section 20 for example.

The light interference optical head section 21 includes a beam splitter 211 and a collimator lens 212. Light which is output from the light output section 20 is emitted to the beam splitter 211 in parallel through the collimator lens 212 from a direction intersecting with an optical axis L of the objective lens section 22 at right angles. Light is output from the beam splitter 211 along an optical axis L, and parallel beam is emitted to the objective lens section 22 from above.

Figure 3:
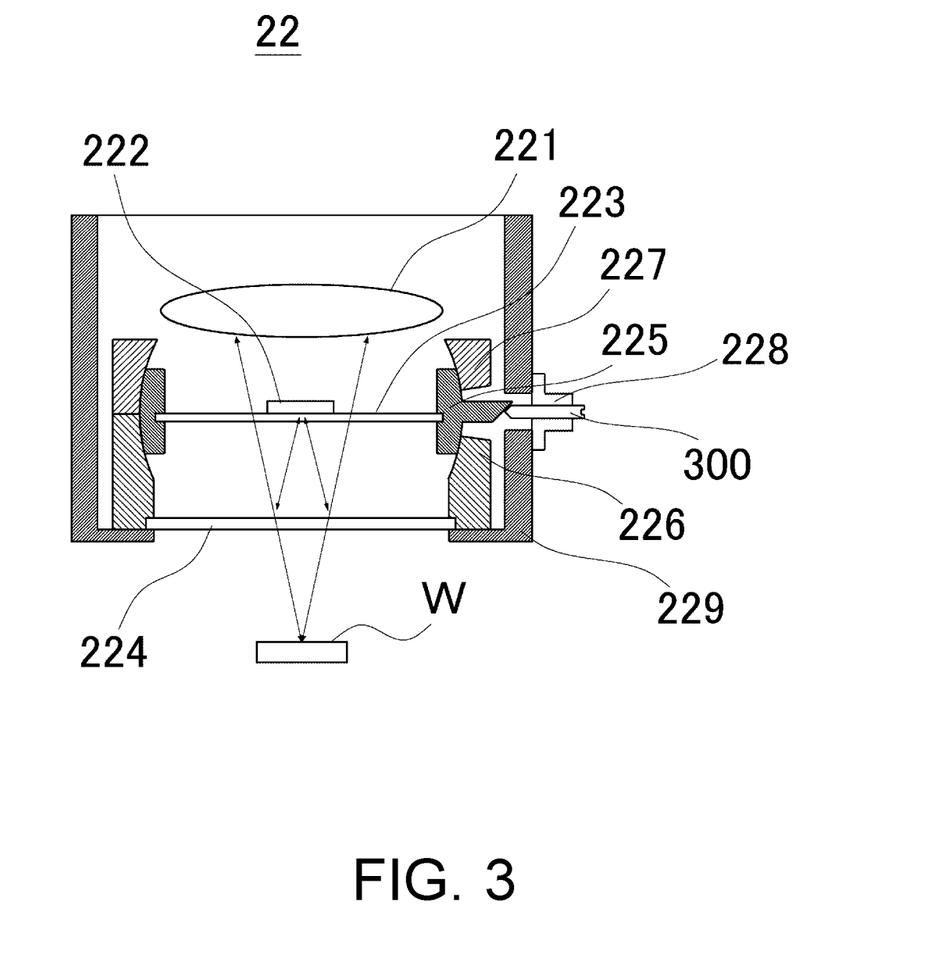
FIG. 3 is a sectional view showing a structure of an objective lens section 22.

FIG. 3 is a schematic diagram showing a configuration of the objective lens section 22. The objective lens section 22 includes an optical system composed of an objective lens 221, a glass plate 223 having a reference mirror 222, and a beam splitter 224 located on the same optical axis from above in this order. The optical axis L of the objective lens section 22 is adjusted such that the optical axis L matches with a Z axis which is perpendicular to the X axis and the Y axis. A work W is placed on the stage 12 below the objective lens section 22. The optical system of the objective lens section 22 is placed in a cylindrical lens barrel 229. The objective lens 221 and the beam splitter 224 are mounted such that a positional relation with respect to the lens barrel 229 is not changed. The glass plate 223 is a clear thin plate made of glass, and the reference mirror 222 is mounted on a central portion of the glass plate 223 in such a direction that a reflection surface of the reference mirror 222 comes into contact with the glass plate 223.

Figure 4A:
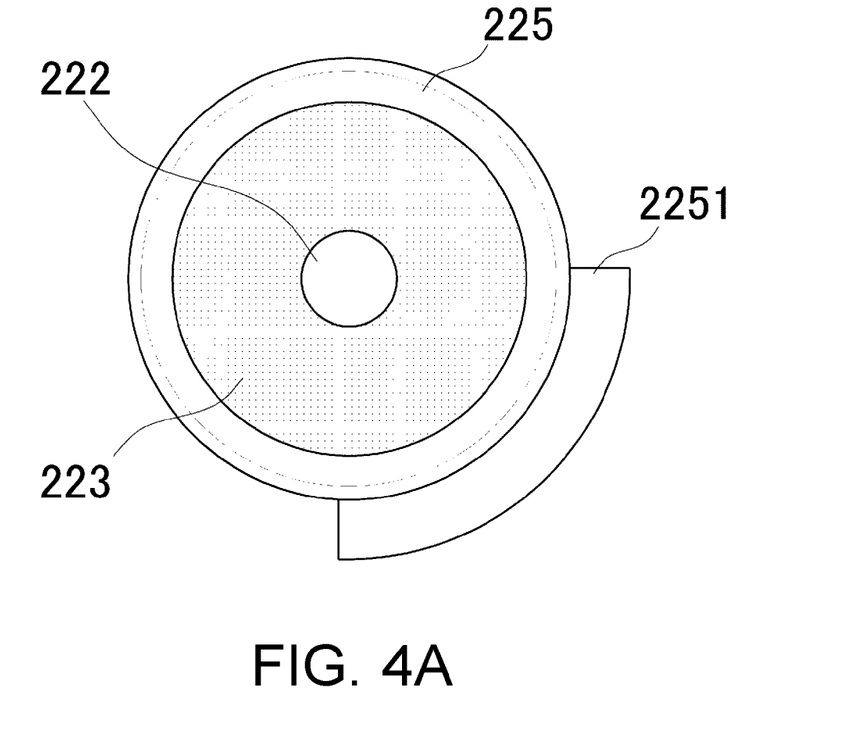
FIG. 4A is a top view of a holding member 225 in a first embodiment holding a glass plate 223 having a reference mirror 222.
Figure 4B:
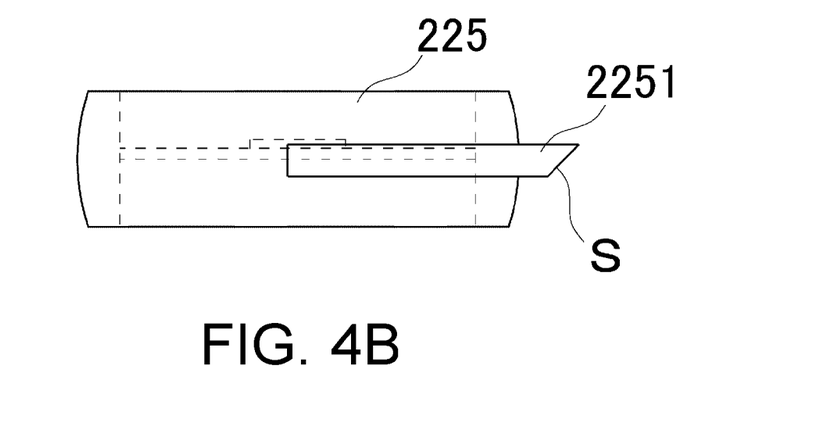
FIG. 4B is a side view of the holding member 225 in the first embodiment.

FIG. 4A is a top view of a holding member 225 holding the glass plate 223 having the reference mirror 222, and FIG. 4B is a side view of the holding member 225. The holding member 225 has a spherical surface-shaped outer surface and a cylindrical inner surface. The holding member 225 holds the glass plate 223 having the reference mirror 222 such that a center of the reflection surface of the reference mirror 222 and a center of the spherical surface forming the outer surface of the holding member 225 match with each other. The holding member 225 includes a recess formed in a cylindrical inner surface thereof, and the glass plate 223 may be held in the recess. An adjusting screw receiving portion 2251 projects from the outer surface the holding member 225 over at least 90° around a center axis of the holding member 225. A tip end of the adjusting screw receiving portion 2251 is provided with an inclination surface S which inclines with respect to a plane intersecting with the center axis at right angle.

A support member 226 and a press-frame 227 both having spherical surface-shaped recesses corresponding to an outer surface of the holding member 225 are provided in the lens barrel 229. The support member 226 and the press-frame 227 swingably support the holding member 225 which holds the glass plate 223 having the reference mirror 222. An opening is formed in a boundary between the support member 226 and the press-frame 227 in a state where the support member 226 supports the holding member 225 and the press-frame 227 presses the holding member 225. The holding member 225 is supported in a state where the adjusting screw receiving portion 2251 is exposed from this opening.

Figure 5:
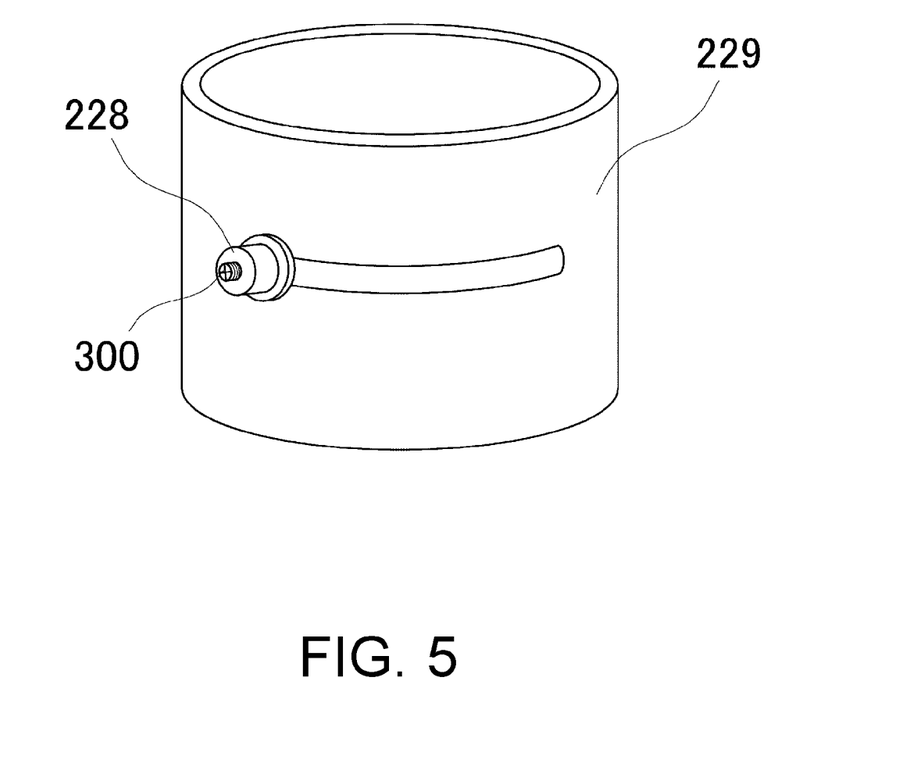
FIG. 5 is a perspective view showing an outward appearance of a lens barrel 229 in the first embodiment.

FIG. 5 is a perspective view showing an outward appearance of the lens barrel 229. The outer surface of the lens barrel 229 is provided with an adjusting ring unit 228 (corresponding to adjusting screw hole of present invention). The adjusting ring unit 228 is mounted such that it can move in a range (i.e., range of at least 90° around center axis of holding member 225) corresponding to the opening in the boundary between the support member 226 and the press-frame 227. The adjusting ring unit 228 may be mounted through a rail which defies a movable range and a movable direction for example. A screw hole formed with a female thread is provided in a center portion of the adjusting ring unit 228. An adjusting screw 300 is threadedly inserted into the screw hole. The screw hole is provided in a direction intersecting with a center axis of the lens barrel 229 at right angles (i.e., radial direction), and the adjusting screw 300 moves in the radial direction of the lens barrel 229 in accordance with a screwing amount of the adjusting screw 300. The adjusting screw 300 is screwed until its tip end abuts against the inclination surface S of the adjusting screw receiving portion 2251. If the adjusting screw 300 is further screwed, the inclination surface S is pressed upward, and the holding member 225 rotates in the support member 226 and the press-frame 227. The inclination of the holding member 225 is changed in accordance with the screwing amount of the adjusting screw 300 in this manner. The holding member 225 may be biased in a direction against the change in inclination caused by the screwing motion of the adjusting screw 300 (i.e., direction opposite from direction in which the inclination amount is increased by screwing motion of adjusting screw). According to this, even if the screwing amount is reduced, it is possible to change the inclination of the holding member 225 such that the tip end of the adjusting screw 300 and the inclination surface S of the adjusting screw receiving portion 2251 abut against each other. A direction in which the adjusting screw 300 is screwed is a maximum inclination angle direction of inclination of the holding member 225. Therefore, it is possible to change an inclination direction of the holding member 225 by changing a position of the adjusting ring unit 228.

According to the above-described configuration, it is possible to adjust the inclination of the reference mirror 222 without rotating the entire unit which holds the reference mirror 222 and the beam splitter 224, and a desired interference fringe can be obtained. Further, since a reflection surface of the reference mirror 222 is always located at a focus position of reflection light from the beam splitter 224, it is possible to prevent the out-of-focus caused by the adjustment.

Figure 6:
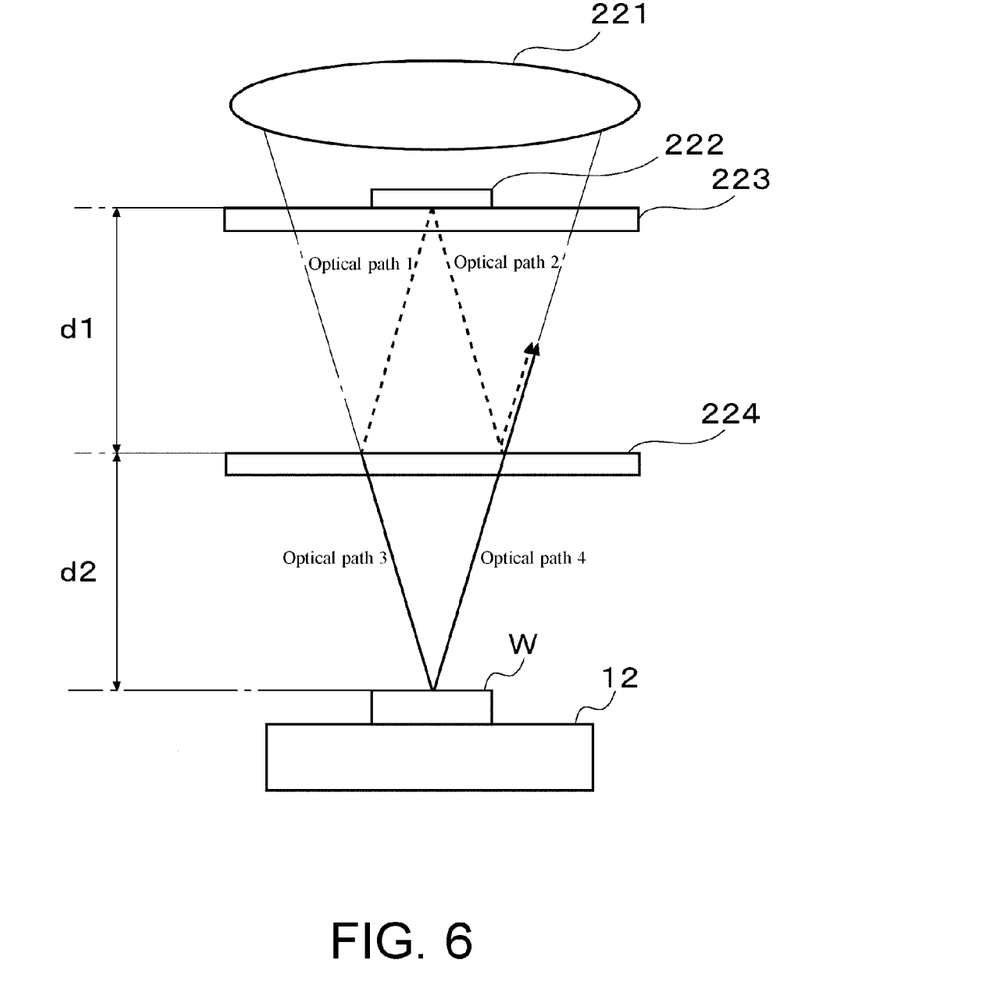
FIG. 6 is an enlarged view of essential portions showing an optical system, a measurement optical path and a reference optical path of an objective lens section 22.

Interference operation will be described with reference to FIG. 6 based on the assumption that parallel beam is emitted from a location above the objective lens section 22 to the objective lens 221 through the light interference optical head section 21. Note that a configuration for adjusting the inclination of the reference mirror 222 (e.g., holding member 225, support member 226, press-frame 227, adjusting ring unit 228 and adjusting screw 300) is omitted in FIG. 6. Note that although the configuration will be described using an optical path extending along an arrow in FIG. 6, the actual interference occurs rotationally symmetrically with respect to the optical axis L.

First, incident light becomes converging light by the objective lens 221, and enters the beam splitter 224. Here, the incident light is divided into reflection light passing through a reference optical path (broken lines in FIG. 6) having the reference mirror 222 and transmitted light passing through a measurement optical path (solid lines in FIG. 6) where a work W is placed.

The reflection light is converged and reflected by the reference mirror 222 and then reflected by the beam splitter 224. A phase difference control member is mounted on the beam splitter 224, and a phase of reflection light passing through the reflection optical path and reflection light passing through the measurement optical path is adjusted. In contrast, the transmitted light is converged and applied to one point of a work W, and reflected there and enters the beam splitter 224 and passes through the same. Reflection light from the reference mirror 222 and reflection light from the work W are combined by the beam splitter 224 and become combined wave.

The combined wave becomes parallel beam by the objective lens 221, travels upward and enters the image forming lens 23 (dashed-dotted lines in FIG. 2). At this time, when lengths of optical paths of the reflection optical path (optical path 1+optical path 2) and the measurement optical path (optical path 3+optical path 4) are equal to each other, an interference fringe is generated.

The imaging section 24 is a CCD camera or the like composed of a two-dimensional imaging device for configuring imaging means, and the imaging section 24 images an interference image of combined wave (reflection light from work W and reflection light from reference mirror 222) which is output from the objective lens section 22.

The drive mechanism 25 moves the light interference optical head 152 in the direction of the optical axis L by a moving command from the computer system 2. Here, in FIG. 6, if a distance from the beam splitter 224 to the reference mirror 222 is defined as d1 and a distance from the beam splitter 224 to a light collection position in a measuring surface of the work W is defined as D2, a difference in optical path lengths at a position of d1=d2 becomes 0. Therefore, when measurement is carried out, the distance of d2 is adjusted by moving the light interference optical head 152 in the optical axis direction (i.e., Z axis direction) such that the difference in the optical path lengths becomes 0 (d1=d2). Although the light interference optical head 152 is moved in the above description, the distance d2 may be adjusted by moving the stage 12. The distance d1 from the beam splitter 224 to the reference mirror 222 may be variable. The drive mechanism 25 changes the length of any one of the reference optical path and the measurement optical path as optical path length-changing means.

The light interference optical head 152 repeats an imaging operation by the imaging section 24 in a state where a position of the light interference optical head 152 in the direction of the light axis L is moved by the drive mechanism 25 and the light interference optical head 152 is scanned under control of the computer system 2. Image date of the interference image at each of the moving scanning positions which is imaged by the imaging section 24 is captured into the computer system 2, the moving scanning position where the interference fringe peaks is detected in each of positions in the measured view, and a height in each of positions of the measuring surface of the work W (Z direction position) is obtained.

The computer system 2 includes the computer body 201, a keyboard 202, a joystick box (J/S, hereinafter) 203, a mouse 204, and a display 205.

Figure 7:
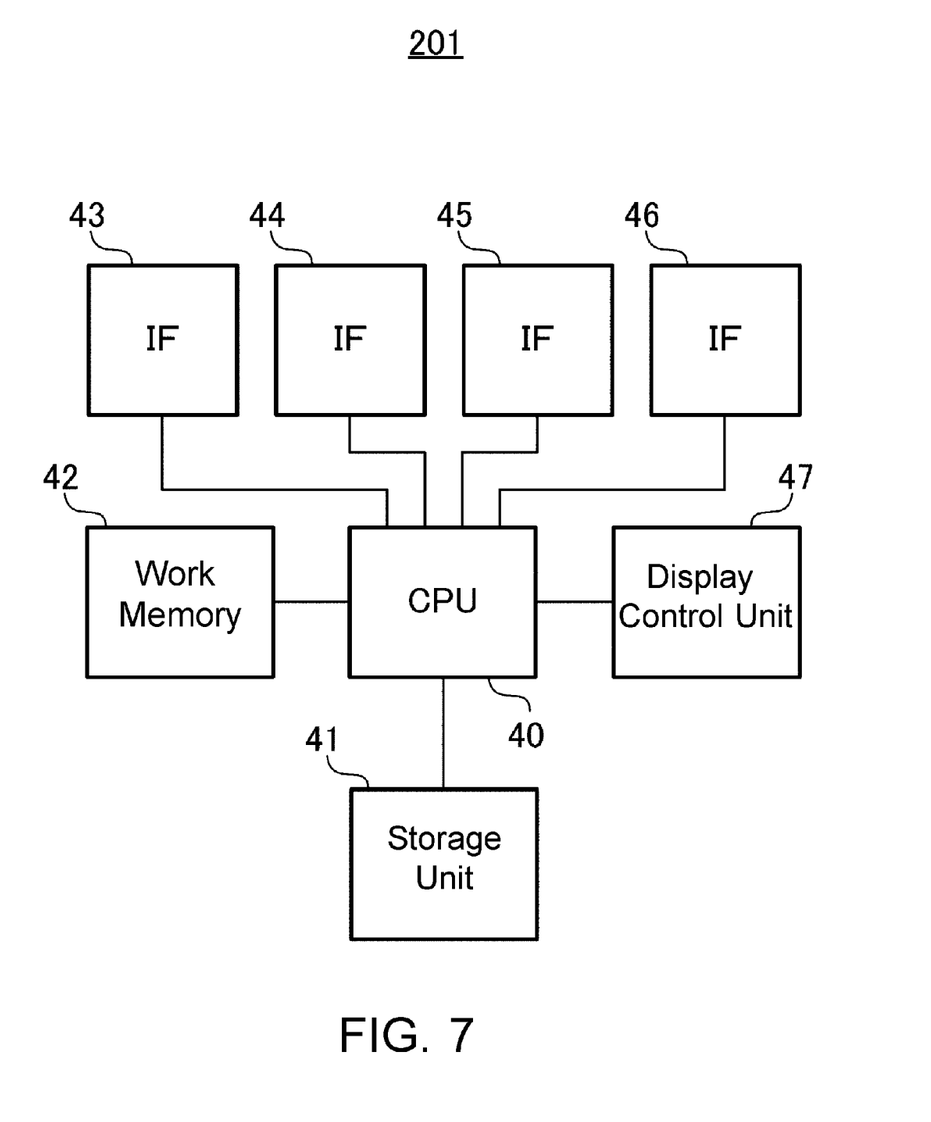
FIG. 7 is a block diagram showing a configuration of a computer body 201.

As shown in FIG. 7, the computer body 201 includes a CPU 40 which performs a major part of control, a storage unit 41, a work memory 42, interfaces (IFs) 43, 44, 45 and 46, and a display control unit 47 which controls display on the display 205.

Instruction information of an operator which is input from the keyboard 202, the J/S joystick 203 and the mouse 204 is input to the CPU 40 through the interface 43. The interface 44 is connected to the measuring device, supplies various kinds of control signals from the CPU 40 to the measuring device, receives various kinds of status information and measurement results from the measuring device, and inputs them to the CPU 40.

When an image measurement mode is selected, the display control unit 47 displays, on the display 205, an image based on an image signal supplied from the CCD camera of the vision optical head 151. When a light interference measurement mode is selected, the display control unit 47 appropriately displays, on the display 205 under control of the CPU 40, an image imaged by the light interference optical head 152, CAD data, three-dimensional form data measured by the light interference optical head 152, and the like. Measurement results obtained by the vision optical head 151 and the light interference optical head 152 can be output to the printer through the interface 45. The interface 46 converts CAD data (design data) of a work W supplied by an exterior CAD system (not shown) into a predetermined form, and inputs the same to the computer system 2.

The work memory 42 provides a working area for various kinds of processing of the CPU 40. The storage unit 41 is composed of a hard disk drive and a RAM for example, and stores a program executed by the CPU 40 and a measurement result by the measuring device, and the like.

The CPU 40 executes various kinds of processing including: switching processing between the image measurement mode by the vision optical head 151 and the light interference measurement mode by the light interference optical head 152; designating processing of a measurement region; moving processing of the imaging unit 15 in the direction of the X axis; moving processing of the stage 12 in the direction of the Y axis; imaging processing by an two-dimensional image by the vision optical head 151; measuring processing of an interference image by the light interference optical head 152; calculating processing of three-dimensional form data, and the like, based on various kinds of input information through the interfaces, instructions of an operator and a program stored in the storage unit 41 and the like. The CPU 40 executes the program stored in the storage unit 41, thereby realizing a function of control means of the present invention.

Figure 8:
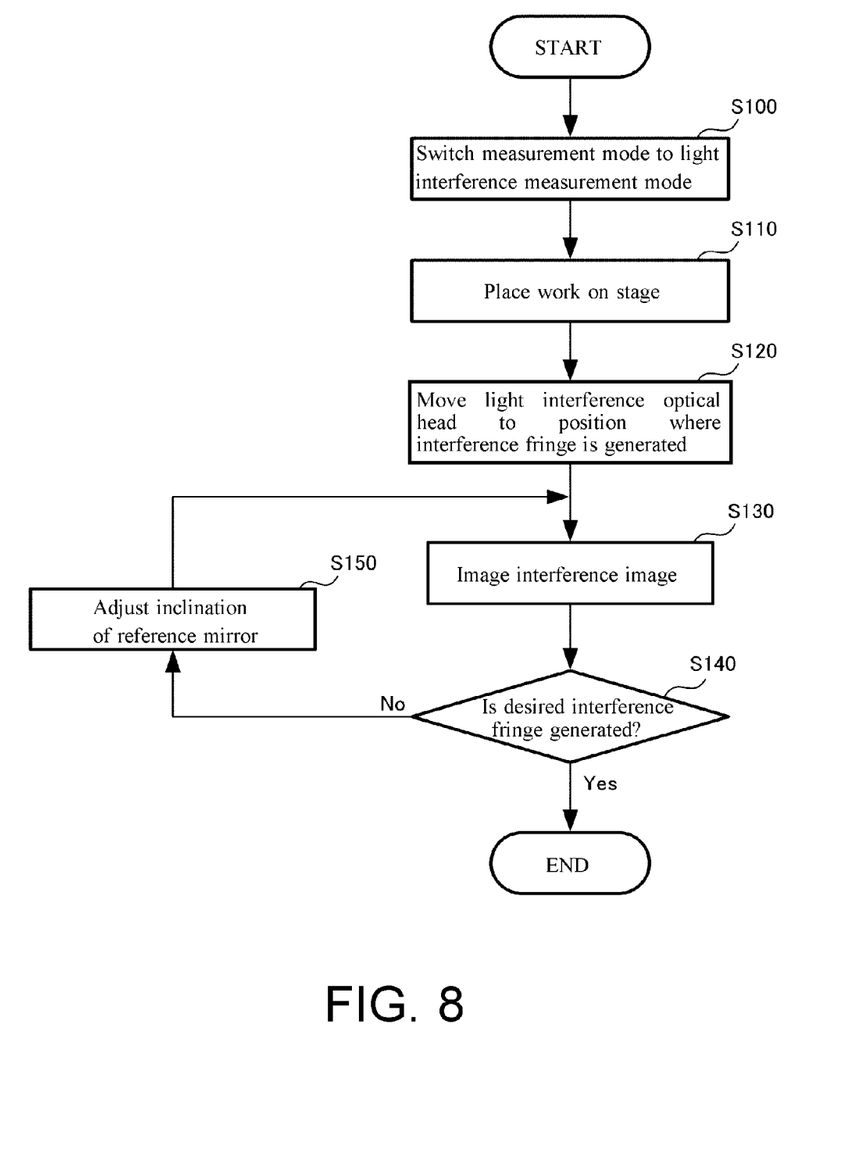
FIG. 8 is a flowchart showing a procedure of adjusting an inclination of the reference mirror 222.

FIG. 8 is a flowchart showing a procedure for adjusting an inclination of the reference mirror 222 to generate a desired interference fringe so as to measure a three-dimensional form using the measuring device according to the embodiment.

First, the measurement mode is switched to the light interference measurement mode by the light interference optical head 152 (step S100). Next, a work W is placed on the stage 12 (step S110). Thereafter, to generate an interference fringe, the drive mechanism 25 moves the light interference optical head 152 in the optical axis direction (step S120), and the imaging section 24 images an interference image (step S130). Then, it is determined whether a desired interference fringe is shown up on the obtained image (step S140). If the desired interference fringe is not shown up (step S140; No), procedure proceeds to step S150 and the inclination of the reference mirror 222 is adjusted. In step S150, the adjusting ring unit 228 and the adjusting screw 300 are operated in accordance with an interference fringe shown up on the interference image which is imaged in step S130, and the inclination of the reference mirror 222 is adjusted such that the number of interference fringes shown up in the image are obtained and the interference fringes are oriented in a desired direction. The procedure returns to step S130. When a desired interference fringe is shown up (step S140; Yes), the adjustment is completed.

Figure 9:
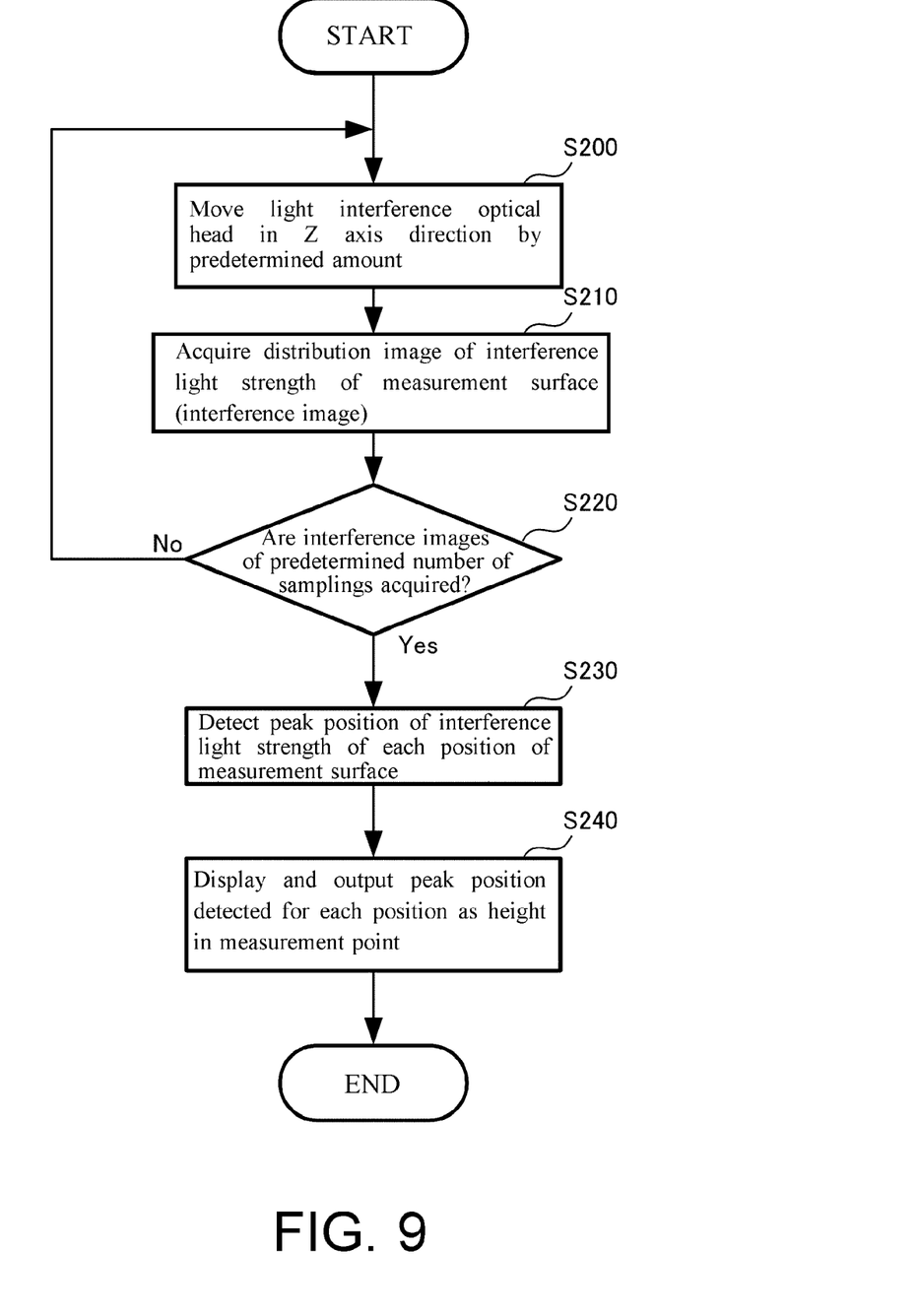
FIG. 9 is a flowchart showing a procedure of measuring a three-dimensional form carried out by the light interference optical head 152.

Next, a procedure for measuring a three-dimensional form by the light interference optical head 152 will be described with reference to a flowchart shown in FIG. 9. Measurement of a measurement work is carried out by replacing an adjustment work W by a measuring object work W in a state where the above-described adjustment is completed. If measurement of the three-dimensional form is started, the light interference optical head 152 is moved in the optical axis direction (Z axis direction) by a predetermined amount (S200), and an interference image showing a two-dimensional distribution of interference light strength of a measurement surface is imaged (S210). This operation is repeated by the number of predetermined samplings (S200 to S220). If a predetermined number of interference images are accumulated, a peak position of an interference light strength row showing change of interference light strength caused by change of a difference in optical path lengths in each of measurement positions of the measurement surface is detected (S230). Then, the peak position of each of the detected measurement positions is displayed and output as a height in the measurement point (S240).

Second Embodiment

A second embodiment of the present invention will be described below based on the drawings. A light interference measuring device according to the second embodiment is characterized in that a holding member 225 having a plurality of adjusting screw receiving portions 2251 holds a reference mirror 222 instead of the holding member 225 of the first embodiment, a lens barrel 229 includes adjusting ring units 228' at positions opposed to a tip end of each of the adjusting screw receiving portions 2251. Since the second embodiment is the same as the first embodiment except different points generated by employing such a configuration, description of the same configurations will be omitted.

Figure 10A:
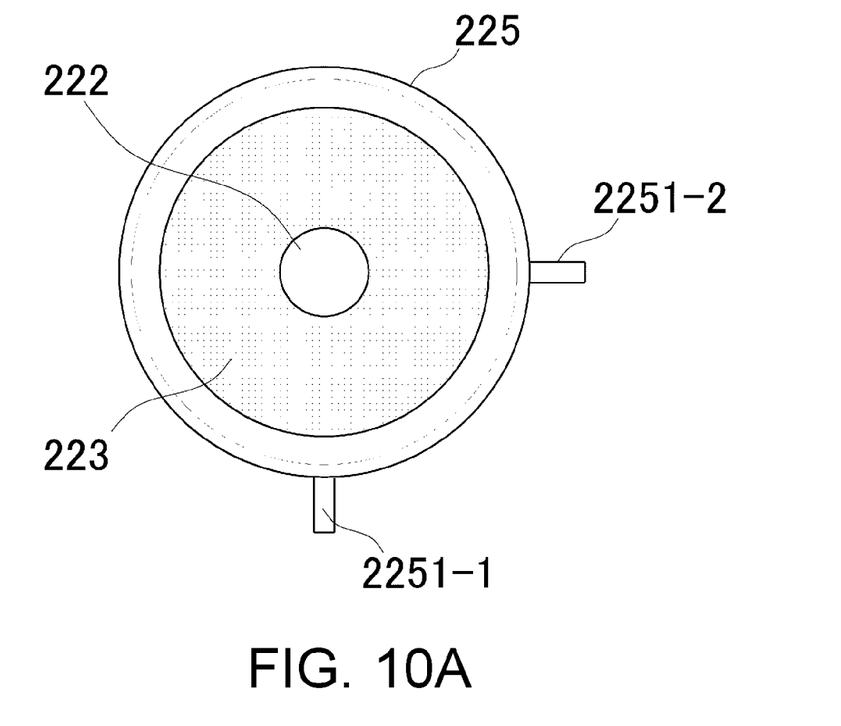
FIG. 10A is a top view of a holding member 225 in a second embodiment holding a glass plate 223 having a reference mirror 222.
Figure 10B:
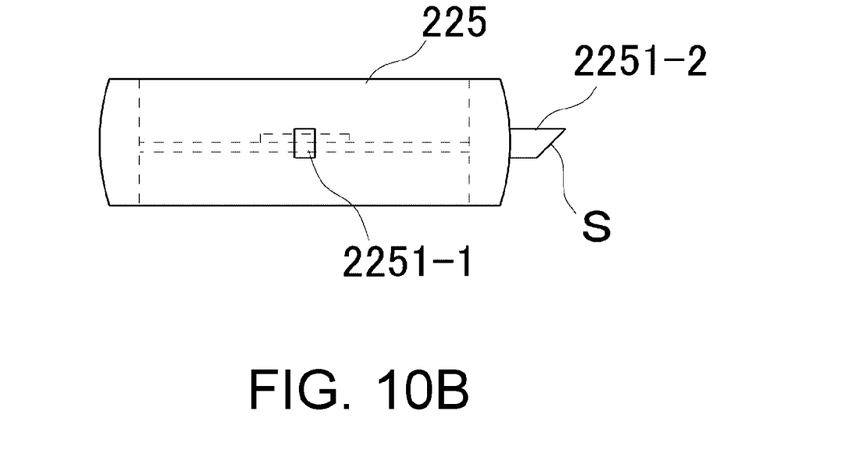
FIG. 10B is a side view of the holding member 225 in the second embodiment.

FIG. 10A is a top view of the holding member 225 in the second embodiment, and FIG. 10B is a side view of the holding member 225. The holding member 225 has a spherical surface-shaped outer surface and a cylindrical inner surface. The holding member 225 holds a glass plate 223 having a reference mirror 222 such that a center of a reflection surface of the reference mirror 222 matches with a center of the spherical surface which forms the outer surface of the holding member 225. The two adjusting screw receiving portions 2251-1 and 2251-2 project from the outer surface of the holding member 225 at positions deviated from each other 90° around a center axis of the holding member 225. More specifically, the first adjusting screw receiving portion 2251-1 projects from the outer surface of the holding member 225 in the X axis direction, and the second adjusting screw receiving portion 2251-2 projects from the outer surface of the holding member 225 in the Y axis direction. Inclination surfaces S are provided on tip ends of the adjusting screw receiving portions 2251-1 and 2251-2. The inclination surfaces S incline from a plane intersecting with center axes of the adjusting screw receiving portions 2251-1 and 2251-2.

A support member 226 and a press-frame 227 having spherical surface-shaped recesses corresponding to the outer surface of the holding member 225 are provided in the lens barrel 229. The support member 226 and the press-frame 227 swingably support the holding member 225 which holds the glass plate 223 having the reference mirror 222. An opening is formed in a boundary between the support member 226 and the press-frame 227 in a state where the support member 226 supports the holding member 225 and the press-frame 227 presses the holding member 225. The holding member 225 is supported in a state where the adjusting screw receiving portions 2251-1 and 2251-2 are exposed from the opening.

Figure 11:
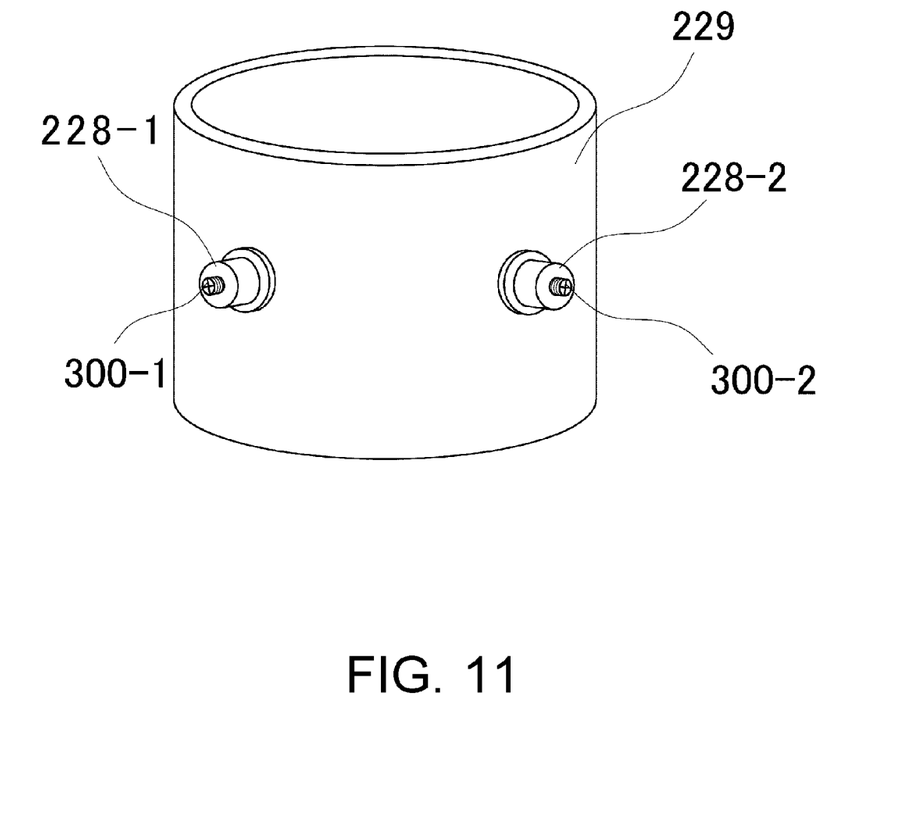
FIG. 11 is a perspective view showing an outward appearance of a lens barrel 229 in the second embodiment.

FIG. 11 is a perspective view showing an outward appearance of the lens barrel 229 of this embodiment. The outer surface of the lens barrel 229 is provided with adjusting screw holes 228-1 and 228-2 at position respectively opposed to tip ends of the adjusting screw receiving portions 2251-1 and 2251-2. A center of each of the adjusting screw holes is provided with a screw hole formed with a female thread. Adjusting screws 300-1 and 300-2 are respectively threadedly inserted into the screw holes of the adjusting screw holes 228-1 and 228-2. Each of the screw holes is provided in a direction intersecting with a center axis of the lens barrel 229 at right angles (i.e., radial direction), and each of the adjusting screws moves in the radial direction of the lens barrel 229 in accordance with a screwing amount of the adjusting screw. Each of the adjusting screws 300 is screwed until its tip end abuts against the inclination surface S of the adjusting screw receiving portion, and inclination of the holding member 225 changes in accordance with the screwing amount of the adjusting screw 300. In this embodiment, it is possible to arbitrary change the inclination direction and the inclination amount by adjusting the screwing amounts of the two adjusting screws having screw directions which are different from each other 90°. The holding member 225 may be biased in a direction against change in inclination caused by screwing of the adjusting screw (i.e., direction opposite from direction in which the inclination amount is increased by screwing motion of adjusting screw). According to this, even if the screwing amount is reduced, it is possible to change the inclination of the holding member 225 such that the tip end of the adjusting screw and the inclination surface S of the adjusting screw receiving portion abut against each other.

According to the above-described configuration, it is possible to adjust the inclination of the reference mirror 222 without rotating the entire unit which holds the reference mirror 222 and the beam splitter 224, and a desired interference fringe can be obtained. Further, since the reflection surface of the reference mirror 222 is always located at a focus position of reflection light from the beam splitter 224, it is possible to prevent the out-of-focus from generating by the adjustment.

Modifications of Embodiments

The present invention is not limited to the above-described embodiments, and modifications and improvements within the scope capable of achieving the object of the invention are included in the invention.

For example, the white light interference optical head using the light source which emits white light is used as the light interference optical head in the embodiments. Alternatively, the light interference optical head may be a monochromatic light interference optical head using a light source which emits monochromatic light, or it is possible to employ a light interference optical head using a light source capable of outputting light while switching between white light and monochromatic light and white light interference measurement having a wide measurement range and monochromatic light interference measurement capable of extremely precisely measuring may be carried out in a switching manner. A desired wavelength laser may be used as the light source which emits monochromatic light. When the monochromatic color light interference measurement is carried out, three or more interference images are imaged while changing an optical axis direction of the light interference optical head 152 or a wavelength of the light source, and a measurement value (height of each of measurement positions) may be obtained by calculation based on interference light strength of the three or more images.

Although the image measuring device using the mirau type interferometer is described in the embodiments, the present invention can be applied also to a measuring device using an interferometer other than the image measuring device. The present invention can be applied also to measuring devices using other optical path interferometers such as a Michelson interferometer, a Fizeau interferometer and a Twyman-Green interferometer.

The embodiments are described based on the example of the image measuring device using the mirau type interferometer in which the adjusting screw exposed outside of the lens barrel is manually fastened to adjust the inclination of the reference mirror. Alternatively, the present invention can be applied also to a measuring device using an interferometer other than the image measuring device. Further, the invention can be also applied to a measuring device using other optical path interferometers such as the Michelson interferometer, the Fizeau interferometer, and the Twyman-Green interferometer.

Although the objective lens section 22 of the second embodiment includes the two adjusting screw receiving portions 2251 and the two adjusting screw holes 228', the objective lens section 22 may have more adjusting screw receiving portions 2251 and more adjusting screw holes 228'.

In the embodiments, in the light interference optical head section 21, light is emitted from the beam splitter 211 along the optical axis L, and the objective lens section 22 is irradiated with parallel beam from above. However, the optical system for illumination is not limited to this. For example, Kohler illumination may employed to irradiate a work W with even light. As one example of Kohler illumination, light (non-parallel light) oriented to the optical axis L through a beam splitter may be formed at a pupil position of an objective lens, this light is made into parallel light through the objective lens, and the work W may be irradiated with the parallel light. According to such Kohler illumination, the work W can be irradiated with light having even brightness.

INDUSTRIAL APPLICABILITY

If the present invention is applied to a light interference measuring device, it is possible to easily adjust an inclination of a reference mirror which generates an interference fringe.

What is claimed is:

1. An interference objective lens system comprising:
an objective lens;
a beam splitter which is placed between a measurement surface of a measuring object and the objective lens, which diverges light emitted from the objective lens into a reference optical path and a measurement optical path, and which outputs combined wave in which reflection light passing through the reference optical path and reflection light passing through the measuring object are combined;
a reference mirror which is placed in the reference optical path and which reflects, by the beam splitter, light diverged into the reference optical path;
a mirror holding member which has a spherical surface-shaped outer surface, and which holds the reference mirror such that a reflection surface of the reference mirror passes through a center of a spherical surface;
a support member which has a spherical surface-shaped inner surface having a diameter which is substantially equal to the outer surface of the mirror holding member, and which supports the outer surface of the mirror holding member by the inner surface;
a reference mirror adjusting mechanism which adjusts a position of the mirror holding member in the support member; and
a lens barrel incorporating the support member, wherein
the mirror holding member includes a projection which projects from the outer surface of the mirror holding member, a tip end of the projection having an inclination surface,
the reference mirror adjusting mechanism includes an adjusting screw hole placed at a position corresponding to the projection of the mirror holding member, and an adjusting screw which is threadedly inserted into the adjusting screw hole and which abuts against the inclination surface of the projection,
an inclination amount of the mirror holding member is adjusted in accordance with a screwing amount of the adjusting screw,
the projection of the mirror holding member extends at least 90° around the outer surface of the mirror holding member with respect to a center axis of the mirror holding member, and
the adjusting screw hole is provided such that it can move at least 90° around an outer surface of the lens barrel with respect to a center axis of the lens barrel.

2. The interference objective lens system according to claim 1, wherein the mirror holding member includes a plurality of the projections, and
the lens barrel includes a plurality of the adjusting screw holes corresponding to the projections.

3. The interference objective lens system according to claim 1, wherein the mirror holding member is biased in a direction opposite from a direction in which an inclination amount is increased when the adjusting screw is fastened.

4. A light interference measuring device including the interference objective lens system according to claim 1.

5. The interference objective lens system according to claim 1, wherein the reference mirror adjusting mechanism adjusts an inclination of the mirror holding member in the support member.

6. The interference objective lens system according to claim 1, wherein an inclination of the reference mirror is adjusted without rotating a whole unit which holds the reference mirror and the beam splitter.

7. The interference objective lens system according to claim 1, an inclination direction of the holding member is adjusted by changing position of the adjusting screw hole.

8. An interference objective lens system comprising:
an objective lens;
a beam splitter which is placed between a measurement surface of a measuring object and the objective lens, which diverges light emitted from the objective lens into a reference optical path and a measurement optical path, and which outputs combined wave in which reflection light passing through the reference optical path and reflection light passing through the measuring object are combined;
a reference mirror which is placed in the reference optical path and which reflects, by the beam splitter, light diverged into the reference optical path;
a mirror holding member which has a spherical surface-shaped outer surface, and which holds the reference mirror such that a reflection surface of the reference mirror passes through a center of a spherical surface;
a support member which has a spherical surface-shaped inner surface having a diameter which is substantially equal to the outer surface of the mirror holding member, and which supports the outer surface of the mirror holding member by the inner surface;

a reference mirror adjusting mechanism which adjusts a position of the mirror holding member in the support member; and a lens barrel incorporating the support member, wherein the mirror holding member includes two projections, each of the projections projecting from the outer surface of the mirror holding member, a tip end of the projection having an inclination surface, the reference mirror adjusting mechanism includes two adjusting screw holes on an outer surface of the lens barrel at a position corresponding to the two projections of the mirror holding member, and two adjusting screws, each of the two adjusting screws being threadedly inserted into each of the two adjusting screw holes and abutting against the inclination surface of the each of the two projections, an inclination amount of the mirror holding member is adjusted in accordance with a screwing amount of each of the two adjusting screws, and the two projections are provided at positions deviated from each other 90° around the center axis of the mirror holding member.

9. The interference objective lens system according to claim 8, wherein the mirror holding member is biased in a direction opposite from a direction in which an inclination amount is increased when the adjusting screw is fastened.

10. A light interference measuring device including the interference objective lens system according to claim 8.

11. The interference objective lens system according to claim 8, wherein the reference mirror adjusting mechanism adjusts an inclination of the mirror holding member in the support member.

12. The interference objective lens system according to claim 8, wherein an inclination of the reference mirror is adjusted without rotating a whole unit which holds the reference mirror and the beam splitter.

13. The interference objective lens system according to claim 8, wherein an inclination direction and the inclination amount of the mirror holding member are adjusted in accordance with the screwing amount of each of the adjusting screws.

* * * * *